(No Model.)

C. E. WILLIAMS.
PAN LIFTER.

No. 555,988.  Patented Mar. 10, 1896.

WITNESSES
Jos. C. Stack.
Edwin L. Bradford

INVENTOR
Charles E. Williams,
by Finckel & Finckel,
Attorneys.

UNITED STATES PATENT OFFICE.

CHARLES E. WILLIAMS, OF COLUMBUS, OHIO.

PAN-LIFTER.

SPECIFICATION forming part of Letters Patent No. 555,988, dated March 10, 1896.

Application filed October 7, 1895. Serial No. 564,954. (No model.)

*To all whom it may concern:*

Be it known that I, CHARLES E. WILLIAMS, a citizen of the United States, residing at Columbus, in the county of Franklin and State of Ohio, have invented certain new and useful Improvements in Pan-Lifters; and I do hereby declare the following to be a full, clear, and exact description of the invention, such as will enable others skilled in the art to which it appertains to make and use the same.

The object of my invention is to provide a tool for lifting and handling pans which shall grasp the pan at its bottom instead of at its sides, as heretofore, and which shall be applicable for handling pans of different depths and different inclination of walls.

Figure 1:
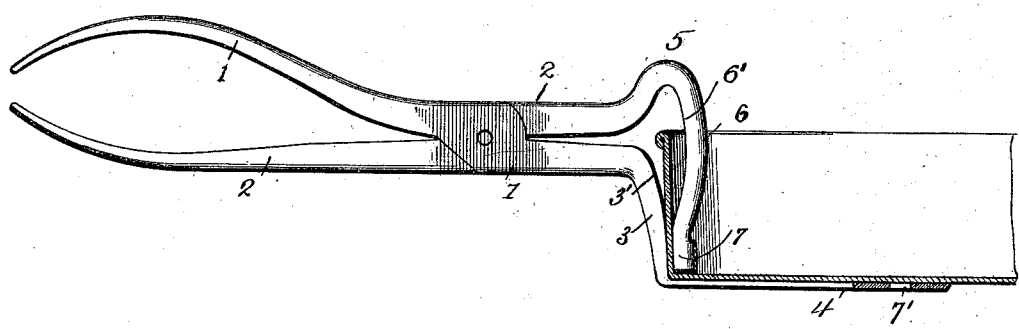
Figure 2:
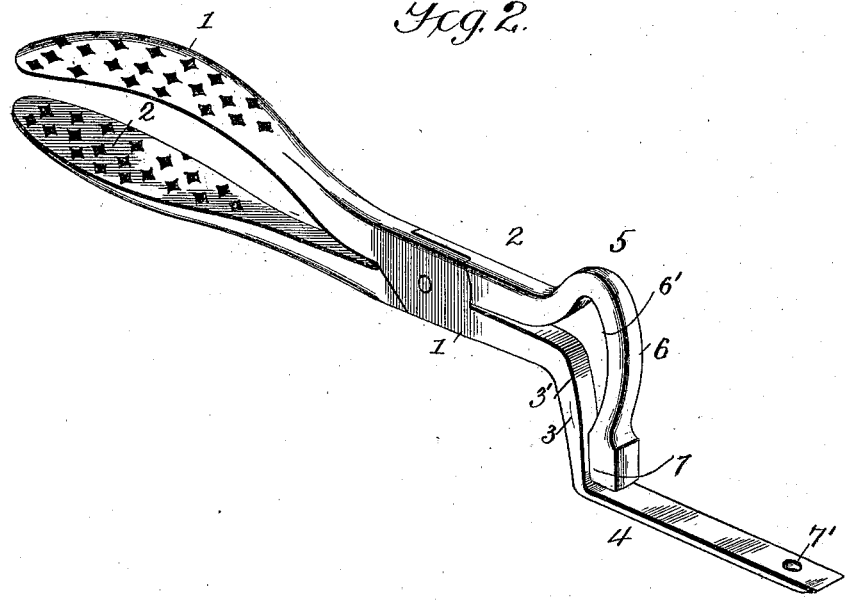

In the annexed drawings, Figure 1 represents a side view of the tool grasping a pan, the pan being in sectional view; and Fig. 2, a perspective view.

The tool is composed of two parts 1 and 2, pivoted together somewhat like a pair of ordinary scissors.

The member 1 has a downwardly-extending shoulder 3 with the outwardly-inclined face 3' and the horizontal blade 4 standing at an obtuse angle to the shoulder to be projected under the pan to support the same.

The member 2 has the upwardly-curved part 5 and the arm 6, with a broad flat end or jaw 7 extending down nearly to, if not quite to, the horizontal blade 4, so that its lower end shall pinch the bottom of the pan against said blade. The inner face 6' of arm 6 is inclined or set back, as shown. When the lower end of the arm 6 is brought into position to pinch the bottom of the pan it also draws the pan into the angle formed by the shoulder 3 and blade 4, and therefore prevents any horizontal movement of the pan in the tool. The space between face 3' and the face 6' is made sufficiently wide and high to receive pans having rims or sides of different inclination and different altitude.

The lower handle or the handle of the part 2 is made somewhat straighter than the upper, so as to permit the arm or jaw 6 to rise and allow the blade to be slid under a pan when lying on an extended flat surface.

The blade 4 will have a hole 7' by which the instrument may be hung on an ordinary hook or nail.

The use of my implement avoids straining or bending the rim, and the pan is grasped at its strongest and most rigid part—namely, at its bottom near the rim.

Another advantage of my construction is that it makes little or no difference what the angle of inclination of the wall of the pan is, the tool being adapted to all ordinary inclinations.

What I claim as new, and desire to secure by Letters Patent, is—

1. A pan-lifter comprising members 1 and 2 the member 1 provided with the downwardly-extending shoulder or part 3 having its outer face 3' set back so as not to contact with the rim of the pan and the blade 4 extending horizontally from said shoulder, and the member 2 provided with the downwardly-extending arm 6 having its inner face 6' set back to evade the rim and a jaw adapted to pinch the bottom of the pan against the blade 4, substantially as shown and described.

2. A pan-lifter comprising members 1 and 2 the member 1 provided with the downwardly-extending shoulder or part 3 having its outer face 3' set back so as not to contact with the rim of the pan and the blade 4 extending horizontally from said shoulder, and the member 2 provided with the downwardly-extending arm 6 having its inner face set back to evade the rim, and the jaw 7 having a broad flat end adapted to pinch the bottom of the pan against the blade 4, substantially as shown and described.

In testimony whereof I affix my signature in presence of two witnesses.

CHARLES E. WILLIAMS.

Witnesses:
GEORGE M. FINCKEL,
H. N. REID.